United States Patent

[11] 3,629,496

[72] Inventor Kenneth R. McConnell
Northport, N.Y.
[21] Appl. No. 889,095
[22] Filed Dec. 30, 1969
[45] Patented Dec. 21, 1971
[73] Assignee Litton Systems, Inc.

[54] ENCODING OF PICTURE SIGNALS IN PHOTOFACSIMILE
10 Claims, 3 Drawing Figs.

[52] U.S. Cl. 178/7.1, 178/DIG. 3, 178/6.7 B
[51] Int. Cl. H04n 1/40
[50] Field of Search 178/6.7 B, DIG. 3, 6.8, 7.1

[56] References Cited
UNITED STATES PATENTS

| | | | |
|---|---|---|---|
| 1,790,722 | 2/1931 | Ranger | 178/DIG. 3 |
| 3,043,906 | 7/1962 | Hassing | 178/6.6 B |
| 3,244,808 | 4/1966 | Roberts | 178/6.8 X |
| 3,482,039 | 12/1969 | Valentin et al. | 178/6.6 B |

*Primary Examiner*—Robert L. Griffin
*Assistant Examiner*—Richard K. Eckert, Jr.
*Attorneys*—Earl R. Evans, M. Michael Carpenter, Alan C. Rose and Alfred B. Levine

ABSTRACT: A method and apparatus for electrically transmitting subject copy such as continuous tone photographs by digitized signals of a character determined by the changes in tone density in different areas of the subject copy. The varying analog signal output of the facsimile scanner is converted into digital signals forming a sequence of short pulses for transmission to the recorder, the digital signals being varied in such a manner as to reproduce the black and the gray shaded areas of the subject copy.

ENCODING OF PICTURE SIGNALS IN PHOTOFACSIMILE

BACKGROUND OF THE INVENTION

The invention pertains to a method and apparatus for encoding picture signals in a photofacsimile system to enable digital transmission of fulltone or halftone images. In accordance with the invention, multilevel picture signals are transmitted by two-level digital signals while avoiding the necessity for encoding each signal level corresponding to the different degrees of shading or density in the subject copy being transmitted.

It has been previously proposed to accomplish this by varying a "function generator" to obtain a discontinuous threshold function representing the variations in the analog video signal, as described for example in the U.S. Pat. to W. R. Young Jr., No. 3,294,896. This is an undesirably complex system, particularly where a number of gray scale levels are to be reproduced. The invention provides a simple and more efficient method and apparatus for this purpose.

BRIEF SUMMARY OF THE INVENTION

The invention relates to a method and apparatus for converting analog video signals in facsimile transmission to binary digital signals to permit transmission over a relatively narrow bandwidth channel. Where the subject copy consists of black and white detail only, the analog video signals generated by the facsimile transmitter or scanner may be transmitted by on-and-off pulses depending upon whether the video signals are above or below a predetermined level. Such a method may be employed for example in the transmission of printed text or characters, outline maps, and so forth. However when the subject copy contains various shades of gray scale (areas of varying density), multilevel signal scanning is required for the desired reproduction of the image or subject copy. Since the intermediate shades of the copy or photograph rarely represent fine detail, in accordance with the invention the desired reproduction is effected by converting the analog video signals into digital signals in the form of a sequence of pulses varying in accordance with the variations in the shades of gray in the subject copy. In order to effect this result, the analog video signals are additively combined with an alternating wave, such as a peaked or sawtooth wave, to form a second signal wave which is modified by a slicer having a predetermined threshold level, and the modified signal wave is digitized by conventional means including signal sampling means having a sampling rate bearing a predetermined relation to the sawtooth or peaked wave.

The purpose of the sawtooth wave is to assure that the sampling process will average a number of black samplings in proportion to the percentage rate or density of the area being scanned. When a steady state mid-gray area is being scanned, with ideal sampling one-half of the samplings would be black and one-half white. As the sampling approaches black the percentage of black samplings increases. If all of the samplings were taken at a fixed phase position on the sawtooth wave when scanning a mid-gray area, sometimes all of the samplings would be black or all of the samplings would be white depending on the position of the sampling pulses in regard to the sawtooth wave. Improved reproduction may be assured by changing the phase of the position of the sawtooth wave relative to the sampling rate in a random or a pseudorandom way or by using a fixed ratio between the sawtooth rate and the sampling rate where the frequency of the sawtooth wave form varies in relation to the sampling in a pseudorandom pattern. By proper selection of this fixed ration successive samples will usually switch from one side to the other side of the midpoint (180°) of the sawtooth wave. As the signal level approaches white there are a decreasing percentage of samplings which are black and the area reproduced will have the aspect of a lighter color or shade due to the eye integrating the black samples within a white field.

In general terms, the object of the invention is to provide a simple and practical method of and apparatus for transmission of photographs and the like in a facsimile transmission system by conversion of the analog video signals into digital signals consisting of a sequence of binary pulses.

DESCRIPTION OF A PREFERRED EMBODIMENT

Figure 1:
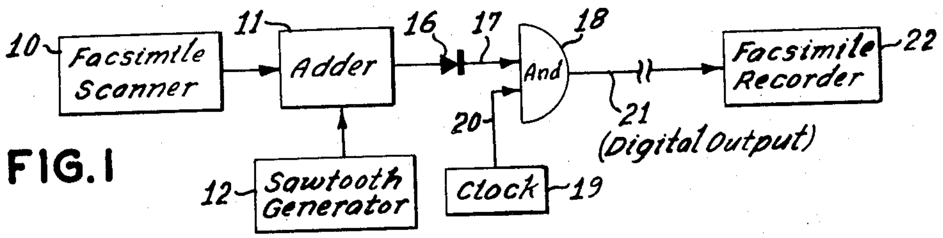
FIG. 1 is a block schematic diagram of a photofacsimile system embodying the invention.

FIG. 1 illustrates a preferred embodiment of the invention in which the analog video signals generated by a conventional facsimile scanner 10 are converted into digital signals or pulses for transmission over a relatively narrow bandwidth channel. No decoding is necessary since the coded video signals may be recorded directly in a conventional facsimile recorder to reproduce copy which has the appearance of a continuous tone or halftone image, the gray being represented by a pattern of black dots. The analog signal output of the scanner 10 is combined in the adder or combining network 11 with the output of an alternating current generator 12, preferably a sawtooth generator.

Figure 2:
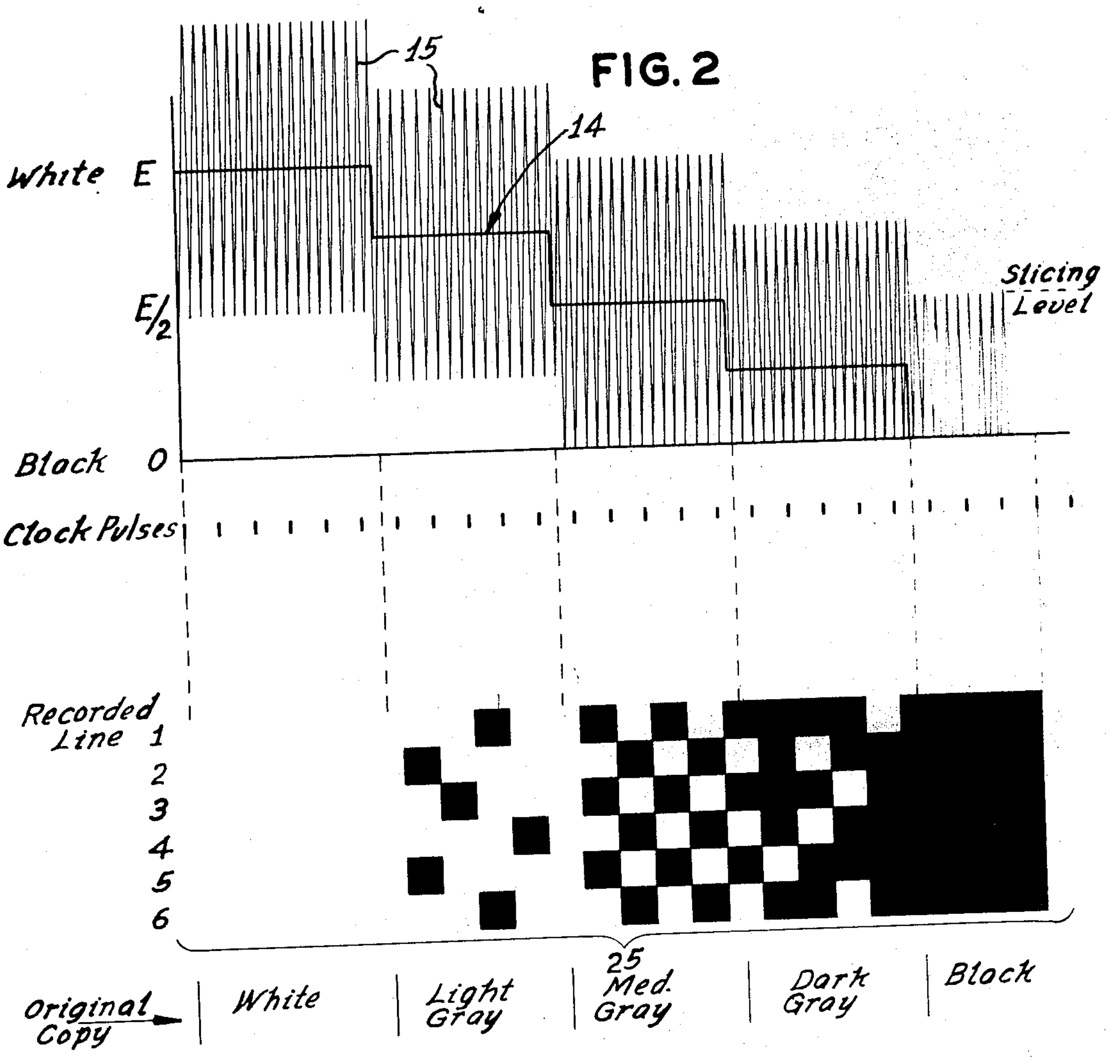
FIG. 2 is a graph showing the relation between the video and sawtooth signals for different gray shadings of the picture or subject copy to be transmitted and the resulting signal pattern.

As shown by way of example in FIG. 2, the analog video signal 14 may vary between O and E volts, which may be termed "black" and "white" for convenience, and the amplitude of the sawtooth wave 15 is approximately equal to E, the maximum amplitude of the video signal. The combined wave output from the adder 11 is impressed upon a biased diode 16 constituting a slicer for passing only signal waves above a predetermined level, for example E/2. The frequency of the sawtooth wave 15 is high compared to the bit rate of the facsimile signal and the output current in the conductor 17 of the slicer 16 will be alternately above and below the slicing level (see FIG. 2) when the analog component 14 is at or near the level E/2. The modified signal wave in conductor 17 is converted into a digitized or binary signal by a conventional analog/digital converter including an AND-gate 18, and a source of timing pulses or bit clock 19 connected to one input terminal and the AND-gate 18 through conductor 20. The digital output in conductor 21 may be employed to reproduce the subject copy in a conventional facsimile recorder 22. As indicated in the recorded signal pattern 25, successive scan lines produce dot patterns (shown greatly enlarged) which depict the varying density or gray scale of the different areas of the original photograph.

Figure 3:
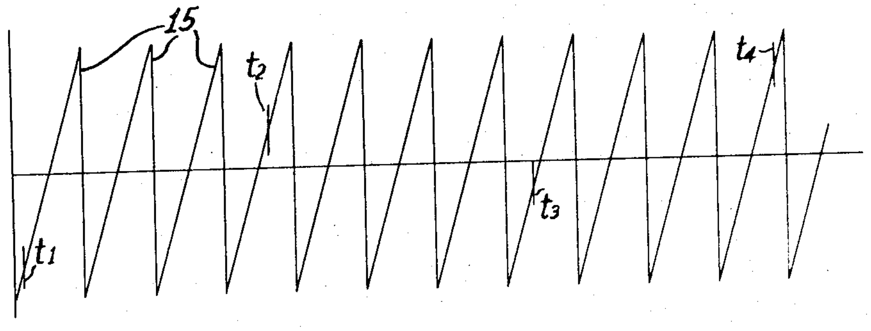
FIG. 3 is a graph to an enlarged scale representing one specific relation by way of example between the sampling pulses and the sawtooth wave in accordance with the invention.

In a preferred arrangement according to the invention, the sampling rate controlled by the clock 19 has a pseudorandom phase relationship to the peaked wave from generator 12. This is illustrated in FIG. 3 wherein the timing or sampling pulses *t1*, *t2*, *t3*, and *t4* are shown in their actual relation to the peaks of the sawtooth wave 15 in point of time for an assumed adjustment. The desired variable relationship is obtained by selecting a suitable fractional ratio between the frequency of the sawtooth wave and the sampling rate or by changing the phase position of the wave in a random or pseudorandom manner.

To clarify the principle involved, consider the case of scanning a steady state mid-gray value of the subject copy, referring to FIG. 2. With ideal sampling, half of the bit samples would be black and half white. As the density approaches white, the black samples must decrease, while increasing as the density approaches black. If there were exactly a fixed whole number of sawtooth waves in each sampling time interval, sometimes all of the samples would be black or all of the samples would be white depending upon the position of the sampling pulse. On the other hand, a varying phase relation between the sawtooth wave and the sampling pulses causes adjacent sampling times to switch from one side to the other side of the midpoint of the sawtooth wave as the signal level approaches white, a decreasing percentage of samples are black to provide the appearance of a lighter color or shade in the reproduced copy. In this way a reproduction of a continuous tone photograph may be made which is satisfactory for many purposes without the necessity of employing a wideband channel for transmission or complicated encoding apparatus.

What is claimed is:

1. Photofacsimile apparatus comprising a scanner for generating analog picture signals representing image density of the subject copy being scanned, and encoding means for digitizing said analog picture signals, said encoding means comprising a. a sawtooth signal generator, b. means for combining said analog signals with the output of said sawtooth generator, c. a slicer for passing only combined signal waves from said combining means above a predetermined level, and d. means for converting said combined signal waves into digital signals occurring at regular intervals.

2. Photofacsimile apparatus according to claim 1, in which said digital signal converting means includes a timing clock for generating sampling pulses and an AND gate responsive to said combined signal waves and said sampling pulses, and the timing of the sampling pulses in such that the phase relation of said pulses to the output of the sawtooth generator varies in a pseudorandom manner.

3. Photofacsimile apparatus according to claim 2, in which the occurrence of the sampling pulses varies alternately above and below the midpoint of the sawtooth wave.

4. Photofacsimile apparatus according to claim 3, in which the timing of the sampling pulses in such that the phase relation timing pattern can repeat only after a large number of clock pulses.

5. Apparatus for electrically transmitting subject copy or images by a coded sequence of digital signals comprising a facsimile scanner for generating analog video signals, means for additively combining a sawtooth wave with said video signals to generate a second signal current in the output thereof, a slicer consisting of two-level threshold means connected to the output of said combining means, and means connected to said slicer for digitizing the resultant video signals, including sampling means, to generate signals in the form of a sequence of pulses varying in accordance with the gray scale variations in the subject copy.

6. Apparatus for transmitting subject copy according to claim 5, in which the sawtooth wave is out of phase with the timing intervals or sampling rate of said sampling means.

7. Apparatus for transmitting subject copy according to claim 5, in which the phase of the sawtooth wave varies in a random manner with respect to the sampling rate.

8. Apparatus for electrically transmitting continuous tone photographs or the like comprising a facsimile scanner for generating analog video signals, means for additively combining a sawtooth wave with said video signals, a biased diode connected to said additive combining means to suppress the modified signal wave below a predetermined level, and analog/digital converting means for digitizing the resultant video signals, said converting means including an AND gate and a source of sampling pulses, said gate having two inputs connected respectively to said diode and said source of sampling pulses to generate binary signals in the form of a sequence of pulses in the output of said gate.

9. The method of facsimile communication comprising the steps of generating analog signals representing subject copy, adding a sawtooth wave of constant amplitude to the analog facsimile signals, suppressing the portion of the resultant signal wave below a predetermined level to produce a two level binary signal wave, sampling the two level binary signal wave at a predetermined bit rate, and generating pulses at the instants of sampling to form a varying sequence of pulses representing the signal level variations of the original analog signals.

10. The method of facsimile communication according to claim 9, in which the frequency of said peaked wave has a predominantly out-of-phase relation to the sampling bit rate.

* * * * *